United States Patent [19]

Crocker

[11] Patent Number: 5,328,507
[45] Date of Patent: Jul. 12, 1994

[54] LIGHT WEIGHT CEMENTITIOUS FORMULATIONS

[75] Inventor: David A. Crocker, Grand Prairie, Tex.

[73] Assignee: Texas Industries, Inc., Dallas, Tex.

[21] Appl. No.: 949,905

[22] Filed: Sep. 23, 1992

[51] Int. Cl.$^5$ .................. C04B 16/08; C04B 7/32
[52] U.S. Cl. ..................... 106/672; 106/692; 106/695; 106/705; 106/713; 106/737; 106/738; 106/817
[58] Field of Search ............... 106/672, 680, 692, 695, 106/705, 713, 737, 738, 816, 817, DIG. 1

[56] References Cited

U.S. PATENT DOCUMENTS

| | | | |
|---|---|---|---|
| 3,600,476 | 8/1971 | Suzuki et al. | 263/52 |
| 3,661,604 | 5/1972 | Artmann | 106/98 |
| 3,775,143 | 11/1973 | Mikhailov et al. | 106/695 |
| 3,997,353 | 12/1976 | Chervenka et al. | 106/695 |
| 4,082,561 | 4/1978 | Nakagawa et al. | 106/695 |
| 4,350,533 | 9/1982 | Galer et al. | 106/695 |
| 4,357,167 | 11/1982 | Kellet et al. | 106/695 |
| 4,504,320 | 3/1985 | Rizer et al. | 106/DIG. 1 |
| 4,741,782 | 5/1988 | Styron | 106/309 |
| 4,769,077 | 9/1988 | Crocker | 106/90 |

OTHER PUBLICATIONS

"What is Light Weight Aggregate?", *Light Weight Concrete*, published by Expanded Shale, Clay and Slate Institute, Washington, D.C. (Oct. 1971).
Kosmatka et al., "Design and Control of Concrete Mixtures", 13th Edition, Portland CementAssociation, pp. 12-25, 68-69, and 163-176 (1988).
Title No. 73-76, "Recommended Practice for the Use of Shrinkage-Compensating Concrete", American Cement Institute Committee 233, *ACI Journal*, Jun. 1976, pp. 319-339.
"A Guide for Testing, Handling and Placing Type K Cement Concrete A Shrinkage Compensating Cement" (Texas Industries (TXI) Publication (date unknown).

*Primary Examiner*—Mark L. Bell
*Assistant Examiner*—Michael Marcheschi
*Attorney, Agent, or Firm*—William D. Jackson

[57] ABSTRACT

A light weight cementitious composition comprising a dry mixture of a hydraulic cement component and an aggregate component and which, upon mixing with water, produces a paste which is easily workable and sets to produce a light weight concrete mass. The hydraulic cement component includes at least two and usually three cement constituents. One constituent is a Type S, Type M or Type N masonry cement. A second constituent is a pozzolanic cement or an expansive cement, and a third constituent is a Type I cement, Type II cement or a Type III portland cement. In this mixture the first and second cement constituents are each present in an amount less than the third cement constituent. The second aggregate component in the dry mixture comprises a light weight aggregate present in an amount to provide a bulk density for the dry mixture of no more than 100 pounds per cubic foot and more specifically, a bulk density of about 85 pounds per cubic foot, or less. The cementitious composition forms a readily workable paste which can be characterized as having a slump loss at one half hour of not more than 2 inches after mixing with water in an amount of about 21-23 wt. % of the dry mixture. The cementitious composition is conveniently packaged in a unit weighing no more than about 50 pounds per container.

55 Claims, No Drawings

LIGHT WEIGHT CEMENTITIOUS FORMULATIONS

TECHNICAL FIELD

This invention relates to light weight cementitious compositions and more particularly, to light weight ready-to-use cement mixes suitable for packaging in small units.

BACKGROUND OF THE INVENTION

In the formulation of cementitious compositions it is known in the art to use mixtures of different hydraulic cements, as well as other additives such as accelerators and retarders in order to provide such characteristics of setting times, strengths, and volume changes as are needed to meet the needs or demands of various specialty applications. Ready-to-use cement mixes are conventionally sold in relatively small packages for convenient use in carrying out small jobs such as in minor repair and patching applications or for the setting of fence posts and similar such endeavors. By way of example, various ready-to-use cement mixes are marketed under the designation "SAKRETE" or "QUIKRETE" and others, in sacks having a volume of about 0.6 cubic feet and weighing about 80 pounds per sack—providing a bulk density of about 135–150 pounds per cubic foot (ppcf). Typically, such ready-to-use mixes are sold as concrete mix containing relatively coarse aggregates, and thus suitable for setting fence posts or the repair of driveways or sidewalks or the like to a thickness of 2 inches or more, and sand mix in which the aggregate component is of a much smaller size suitable for patching with thicknesses less than 2 inches. Concrete mix and sand mix typically comprises a mixture of Type I portland cement, aggregate and sand. Another type of ready-to-use cement mix is mortar mix, which is useful in laying bricks or cement stepping stones or the like. Mortar mix normally is formed of masonry cement meeting ASTM (American Society for Testing Materials) Designation C 91-89, usually Type N cement, mixed with various aggregates to meet specifications called for in ASTM Designation C 387-87 or C 270-89.

Another type of cementitious composition which can be sold in ready-to-use packages is disclosed in U.S. Pat. No. 4,769,077 to Crocker. This patent discloses fast setting shrinkage compensating cementitious formulations for use in effecting grouting repairs in road surfaces and the like. These formulations comprise a hydraulic cement mixture of a major amount of a portland cement constituent and a minor amount of an expansive ettringite forming sulfoalumina cement constituent, along with an aggregate and an accelerator. The accelerator component is a polyvalent metal salt of formic acid, specifically an alkaline earth metal formate such as calcium formate. Specific formulations include mixtures of a Type I, Type IP, or Type III cement with a Type K, Type M, or Type S expansive cement with weight ratios within the range of 2:3. Where Type IP cement is used, it is present as a major cement constituent in relation to the expansive cement. A preferred mixture in the Crocker patent employs Type III high early strength cement and Type K expansive cement in a ratio of Type III to Type K of about 7:3. However, Type M and Type S expansive cements can also be used. These cements, which meet ASTM C 845-90 are not to be confused with masonry cements, as described earlier, meeting ASTM C 91-89. The cementitious composition can be used to effect a grouting repair by mixing the dry formulation with water to provide a cementitious slurry having relatively short initial and final Gilmore setting times, 7 and 16 minutes, respectively, and 1–7 days curing. Aggregates suitable for use in this formulation include those having an average particle size of less than ⅜ inch and meeting standards as set forth in ASTM C 33, ASTM C 144 and ASTM C 330. The latter as described in greater detail below is a light weight aggregate.

The standards for light weight aggregates suitable for use in structural concrete are set forth in ASTM C 330-89. Such aggregates intended for use in masonry units are set forth in ASTM C 331-89. Light weight aggregates and light weight concrete formulations made from such aggregates are described in "Light Weight Concrete", published by the Expanded Shale, Clay and Slate Institute, Washington, D.C., October 1971. As described there under the heading "What is a Light Weight Aggregate?", such aggregates can range from the so-called "super light weights" which can be used in making concrete weighing 15 to 20 pounds per cubic foot to the natural aggregates and finally to the expanded shale, clay and slate aggregates which can produce structural concrete ranging from about 85 to 115 pounds per cubic foot when produced by the rotary kiln method and from about 90 to 120 pounds per cubic foot when produced by sintering. Structural light weight concrete is described as having a 28 day compressive strength of at least 2,500 pounds per square inch and an air dry weight of no more than 115 pounds per cubic foot. Weights can be increased by replacing a portion of the light weight aggregate with sand.

Light weight aggregates in the use of cement formulations are disclosed in U.S. Pat. Nos. 3,600,476 to Suzuki et al., 3,661,604 to Artmann, 4,504,320 to Rizer et al. and 4,741,782 to Styron. The patent to Suzuki et al. discloses the manufacture of light weight aggregates from fly ash and sludge, which can be mixed with portland cement and sand to form concrete blocks. The patent to Artmann discloses light weight concrete having a density of 800–1,800 Kg/m$^3$ (about 50 to 110 pounds per cubic foot) formed from portland cement and an aggregate mixture derived from clay, sand and crushed bricks. The Rizer et al. patent discloses a fiber reinforced cementitious product having a density of less than 85 pounds per cubic foot. Disclosed here is a mixture of Type III and Type I portland cements with an aggregate component including fly ash, silica fume and microspheres. The silica fume is said to appear to have pozzolanic properties. The aforementioned patent to Styron discloses a process for the formulation of light weight aggregate pellets from fly ash, cement and silica fume dust.

SUMMARY OF THE INVENTION

In accordance with the present invention, there is provided a light weight cementitious composition which can be packaged in units that can be more easily handled than commonly available bagged mixes on an equal volume basis and, which upon mixing with water, produces a paste which is easily workable and sets to produce a light weight concrete unit structure of acceptable compressive strength. The cementitious composition of the present invention includes a dry mixture of a hydraulic cement component and an aggregate component. The hydraulic cement component includes at least two and preferably three cement constituents.

One constituent is a masonry cement conforming to ASTM Standard C 91-89. A second constituent is a pozzolanic cement meeting ASTM Standard C 595-89 or an expansive cement meeting ASTM Standard C 845-90, and a third constituent is a Type I cement, Type II cement or a Type III cement meeting ASTM Standard C 150-89. In this mixture the first and second cement constituents are each present in an amount less than the third cement constituent. More specifically, each of the first and second cement constituents comprise 10–30 wt. % of the cement component and the third constituent comprises about 40–60 wt. % of the dry cement component.

The second aggregate component in the dry mixture comprises a light weight aggregate present in an amount to provide a bulk density for the dry mixture of no more than 100 pounds per cubic foot. Preferably, the bulk density will be about 85 pounds per cubic foot, or less. In a more specific characterization of the invention, the aggregate component can be characterized as meeting standards as specified in ASTM C 330-89 for structural concrete and ASTM C 331-89 for masonry concrete.

The cementitious composition of the present invention forms a readily workable paste which can be characterized as having a slump loss at one half hour of not more than 2 inches after hydration with water in an amount of about 21–23 wt. % of the dry cementitious mixture. The cementitious composition can be packaged in a unit weighing no more than about 50 pounds per container, usually about 45 pounds or even slightly less, in replacement of so-called "SAKRETE"-type products of equal volume which normally are packaged in about 80 pound sacks.

In a further aspect of the present invention, there is provided a light weight cementitious composition of a hydraulic cement component and an aggregate component as described above, with the cement component comprising a first masonry cement constituent selected from the class consisting of Type S cement, Type M cement and Type N cement, a second cement constituent selected from the class consisting of Type K expansive cement and a pozzolan containing cement, and a third cement constituent having high early strength characteristics. As described previously, the first and second constituents are present in an amount less than the third constituent. In this embodiment of the invention, preferably the first cement constituent is a Type S or Type N cement. The second constituent is a Type IP cement and the third constituent is a Type III cement.

In another embodiment of the invention, the first cement constituents is a Type S, Type N or Type M masonry cement, as described above, and the second constituent has a high pozzolan content relative to the first constituent and the third has an expansive ettringite forming sulfoalumina containing. More specifically, the third constituent may be a Type K expansive cement.

In yet another embodiment of the invention, there is provided a light weight cementitious composition employing a light weight aggregate as described above, but in which the hydraulic cement component need only have two constituents. In this embodiment of the invention, the cement component comprises a mixture of Type S masonry cement and Type K expansive cement in a weight ratio of Type K to Type S cement within the range of 2:1–4:1.

DETAILED DESCRIPTION OF THE INVENTION

The present invention provides a light weight cementitious composition in the form of a dry mixture which can be packaged in dry form in relatively light weight bags, e.g., about 45 pound bags, and which can be mixed with a defined amount of water to produce a cementitious slurry or paste in plastic form which is readily workable, provides little or no slump loss within a customary working time of about 30 minutes and which produces a light weight structural concrete meeting certain minimum standards. Upon mixing with water in a defined amount, usually about one gallon and one pint of water per bag containing a nominal concrete content of about 45 pounds, the resulting concrete product complies with standards as set forth in ACI (American Concrete Institute) Standards 211.2 and 213. That is, the resulting concrete product has a minimum compressive strength at 28 days (7 days wet cure and 21 days air cure at 50% relative humidity) of 2,500 pounds per square inch and a 28 day air dry density of no more than 115 pounds per cubic foot under the above-specified curing conditions. As a practical matter, substantially lower densities can be achieved without sacrificing strength and workability characteristics. Specifically, 28 day air dry densities of about 100 pounds per cubic foot or slightly less can be achieved with formulations of the present invention. The product of the present invention has a shelf life and pot life (after addition of water) equal to those commonly associated with normal weight ready-to-use concrete mixtures such as those marketed under the designation "SAKRETE" and "QUIKRETE" as described above. The formulation of the present invention is air entraining and thus provides good durability in freezing and thawing environments, as well as in marine applications. Preferably, the formulation has an air entraining factor of 4–8 volume percent air when mixed with water in the range of 21–23 wt. % of the dry mixture. By virtue of the air entrainment after mixing with water, the resulting product has good workability for finishing and pumping and the air entrainment also lowers the unit weight and water demand. While the dry cementitious mixture of the present invention normally will be used alone, it can be combined with the normal (heavier) weight concrete mixtures to economically meet special requirements such as in special finishing and very high compressive, tensile, and shear strength requirements.

In accordance with the invention, the cementitious composition comprises a dry flowable mixture of a multi-constituent hydraulic cement component and a light weight aggregate component. The cement component comprises a mixture of at least two and preferably, three portland cement constituents and may optionally include water reducing normal set, water reducing set retarding, and accelerating admixtures conforming to ASTM Standard C 494-86 and plasticizing admixtures conforming to ASTM Standard C 1017-89.

Portland cements are characterized by type in accordance with standards developed by the American Portland Cement Association and the standards and designations applied there are used in characterizing portland cements herein. For a description of the various examples of portland cements and their application, reference is made to Kosmatka et al. "Design and Control of Concrete Mixtures", Thirteenth Edition, Portland Cement Association, and particularly Chapter 2. "Portland Cements", pp. 12–25.

A first cement constituent in the hydraulic cement component is a masonry cement selected from the class consisting of Type S cement, Type M cement and Type N cement. The standard specifications for masonry type cements are set forth in ASTM 387-87. Type S masonry cement usually will be preferred, followed by Type N and then by Type M. Type S cement has a strength intermediate Type M, which is a relatively high strength masonry cement, and Type N which is a relatively low strength masonry cement. In most of the cementitious compositions formulated in accordance with the present invention, the first constituent will be present in an amount within the range of 20–30 weight percent.

Another cement constituent which preferably is used in formulations embodying the present invention is a high early strength cement characterized by Type III portland cement as described in the aforementioned Chapter 2 of Kosmatka et al. Cements of the high early strength type are composed of four principal compounds. These compounds (with the conventional cement chemistry abbreviated notations given in the parentheses) are tricalcium silicate, $3CaO.SiO_2$ ($C_3S$), dicalcium silicate $2CaO.SiO_2$ ($C_2S$), tricalcium aluminate, $3CaO.Al_2O_3$($C_3A$), and tetracalcium aluminoferrite, $4CaO.Al_2O_3.Fe_2O_3$ The chemical composition of these cements, in terms of weight percent of oxides, is typically about $\frac{2}{3}$ CaO, about$\frac{1}{4}-\frac{1}{3}$ silica, about 3–7% alumina, and usually lesser amounts of $Fe_2O_3$, MgO and $SO_3$. Thus, these portland cement compositions typically contain more than 60% CaO and less than 3% aluminum and 1.5% sulfur. In terms of the cement chemistry notations described above, Type III cement typically contains in weight percent 56% $C_3S$, 19% $C_2S$, 10% $C_3A$ and 7% $C_4AF$. The Type III portland cement is ground to a very fine size which provides for high compressive strengths within a few days. For example, conventional Type III cement has a one day compressive strength of close to 2,000 psi and a 3-day compressive strength of about 3,500 psi (which is near the maximum). Type IIIA portland cement, substantially identical to regular Type III in composition and fineness, but containing an air entraining agent, has a one day compressive strength of about 1,500 psi.

As described in greater detail below, Type I or Type II portland cement can be, in certain circumstances, used in place of or as a supplement to Type III cement. Type I portland cement is substantially identical to Type III in terms of the contents of $C_3S$, $C_2S$, $C_3A$, and $C_4AF$, as described above, but is ground to a substantially coarser size and has a substantially low compressive strength at three days, about 1,800 psi and 1,500 psi, respectively, for Type I and Type IA, respectively. Type II portland cement, which is a sulfate resistant cement, is lower in $C_3S$ and $C_3A$ content than the Type I and Type III cements, but has higher $C_2S$ and $C_4AF$ contents. Type II cement has an even lower 3 day compressive strength than Type I.

Another type of portland cement which can be used as one of the three constituents in the cement component of the present invention is a pozzolan-containing cement. Pozzolans are siliceous or aluminosiliceous materials which, as described in ASTM C 618-89A, possess little or no cementitious value but react in finely divided form with water and calcium hydroxide to form compounds having cementitious properties. Pozzolans are derived from clays, diatomaceous earths, cherts, shales, pumicites and volcanic ashes. As described in the aforementioned Chapter 2 from Kosmatka et al. at page 17, pozzolan-type cements contain between 15 and 45% pozzolan. Pozzolan can be further classified by the designations Class N, Class F, and Class C. Class N is a raw or calcined natural pozzolan. It includes diatomaceous earth, opaline cherts, and shales, tuffs and volcanic ashes or pumicites. Class F is fly ash produced from burning anthracite or bituminous coal and Class C is fly ash produced from lignite or subbituminous coal. As described in Kosmatka et al. at pages 68 and 69, fly ash type materials are usually solid spheres, though some are hollow cenospheres. They range in size from about one micron to about 100 microns. The pozzolan containing cement can be any cementitious material meeting ASTM C-595-89 or alternatively, it can be provided by combining a cement which, in itself, does not contain pozzolan, e.g., a cement meeting ASTM C-150-89 such as Type I cement, with a pozzolanic material such as covered by ASTM C-618-89A. Thus, one can mix a Type I cement with pozzolan without milling to arrive at a suitable pozzolan containing cement. A preferred pozzolanic cement for use in the present invention is Type IP cement, which is similar in chemical composition and physical characteristics, except for the pozzolan, to Type I cement, but which can usually be expected to exhibit slightly lower strengths than Type I cement unless compensations are made.

Another cement constituent which can be used in formulating the cementitious composition of the present invention is selected from the class of ettringite-forming cements commonly referred to as expansive or shrinkage compensating cements. Such expansive cements meet ASTM Standard C 845-90 and are typically substantially higher in aluminum and sulfur content than are the conventional portland cements. In addition, because of the increased amounts of alumina and sulfates present in these cements for the formation of ettringite, the calcium oxide content present in the form of silicates, aluminates and aluminoferrites is less than 62 wt. % and usually less than 60 wt. %. As described in Title No. 73-26 "Recommended Practice for the Use of Shrinkage-Compensating Concrete" by the American Cement Institute (ACI) Committee 233, ACI Journal, June 1976, pages 319–339, such expansive cements, identified as Type K, Type M, and Type S, are based upon portland cements with added sulfoaluminate constituents which provide for the formation of ettringite. The expansive Type M and Type S cements are not to be confused with the Type M and S masonry cements as discussed above. The preferred expansive cement is Type K cement, which contains portland cement, calcium sulfate and calcium sulfoaluminate of the other cements. Type M contains portland cement, calcium sulfate and calcium aluminate cement. Type S comprises a high tricalcium aluminate portland cement and calcium sulfate. For a further description of such ettringite-forming expansive cements, reference is made to Title No. 73-26 above, and also to Texas Industries (TXI) publication "A guide for testing, handling and placing Type K cement concrete a shrinkage compensating cement", the entire disclosures of which are incorporated herein by reference. As further disclosed in Title 73-26 and the TXI publication, the shrinkage compensating cement formulations undergo a fairly rapid expansion after hydration followed by gradual shrinkage during the air drying period. The conventional portland cements, on the other hand, initially remain relatively constant in volume and then shrink in volume until ultimately achieving a substantial reduction in volume.

The relative volume changes for shrinkage compensating cements and for conventional portland cements are shown in Title No. 73-26 and the TXI publication. As shown in FIG. 1 of the TXI publication and in FIG. 2.5.3 of Title No. 73-26, for internally restrained concrete samples, the high ettringite forming cement undergoes an initial volumetric expansion during the initial moist cure period and thereafter undergoes a gradual decrease in volume during the subsequent air drying. The result is that the expansive cement returns to or near its original volume at the conclusion of the curing and drying period.

While shrinkage compensating cements are advantageously used in reinforced concrete applications, the initial expansive action of such cements indicates that they should not be used in circumstances where rigid exterior restraints are present. Thus, as disclosed in Title No. 73-26, rigid exterior restraints are not recommended since they prevent expansion of the concrete with the result that subsequent shrinkage will result in negative strains and concrete tension. For example, where framework is employed, it should be sufficiently flexible to accommodate expansion of the concrete. In fact, Title No. 73-26 suggests that a resilient type of constraint such as provided by internal reinforcement is necessary for proper shrinkage compensation and that other types of restraint, including structural elements or even subgrade friction, should be avoided.

Notwithstanding the prior art indication that shrinkage compensating cements should be used only with internal reinforcement and without rigid exterior restraints, the aforementioned U.S. Pat. No. 4,769,077 to Crocker involves the use of a shrinkage compensation constituent in combination with a conventional Portland cement constituent to provide a closely shrinkage/expansive balanced grouting composition which is generally suitable for use where rigid exterior restraints are present as in patching holes in concrete and the like.

In one embodiment of the present invention, an expansive shrinkage compensating cement of the type used in the formulation of the aforementioned patent to Crocker is employed in combination with a masonry cement constituent or a mixture of a masonry cement and high early strength cement or pozzolanic cement to provide a light weight cementitious composition. The composition, upon hydration, forms a light weight concrete slurry characterized by low slump loss and good workability as described above.

The preferred high early strength cement constituent used in this embodiment of the invention is Type III portland cement having standards as given in ASTM C 150-89, as noted previously, which has much faster setting and strength gain characteristics than Type K cement. As also noted previously, the preferred pozzolanic cement is Type IP cement blended in accordance with ASTM C 595-89.

The second major component of the present invention, the aggregate component, is usually present in an amount equal to or in excess of the amount of the cement component. However, the total cement content can range from about one-third of the total cementitious product, i.e., fifteen pounds of cement in a forty-five pound bag, the remainder being aggregate, to about thirty pounds of cement per forty-five pound bag. Stated otherwise, the ratio of aggregate to cement will be within the range of about 1:2 to 3:2.

The light weight materials used as aggregate in the cementitious composition preferably will have a bulk density within the range of 50–60 ppcf and can be characterized as conforming to ASTM C 330-89, where strength is important because of structural considerations or ASTM Standard C 331-89, where masonry applications are contemplated. Where very fine aggregate is employed, the bulk density may range up to about 70–75 ppcf. Preferably, the aggregate component will have an average particle size of less than ⅜ inch. As a practical matter, the aggregate will have a particle size distribution with a predominant portion passing a No. 4 sieve and more preferably passing a No. 8 sieve. Relatively small amounts of high density aggregate material, such as sand, may be incorporated into the formulation where a somewhat denser product is desired, but usually the aggregate component will contain little, if any, sand or the heavier, conventional aggregate materials. For example, where the formulation contains a very fine aggregate, the bulk density of the aggregate may range up to about 75 ppcf, as described above. Little, if any, sand or similar aggregate material will be present in order to ensure that the bulk density of the cement-aggregate formulation will not exceed one hundred ppcf. Where coarser light-weight aggregate is employed, the bulk density will be less and greater amounts of sand can be used. The character of the aggregate will depend, to some extent, on the relative amounts of aggregate and cement, but, in any event, the aggregate should be used in an amount to provide a bulk density of the dry mixture of no more than about 100 ppcf. Usually it will be preferred to provide a bulk density of the dry mixture of cement and aggregate of no more than about 85 ppcf, more specifically about 75 ppcf. This will enable packaging of the product as a standard size bag of ready-to-mix concrete weighing no more than about 45–50 pounds.

In use, the dry cementitious composition of the present invention is mixed with water to provide a workable slurry having a density within the range of about 95–105 ppcf. The water content may vary somewhat depending upon the nature of the hydraulic cement component as described herein, but the water normally is added in an amount to provide a weight ratio of cement and aggregate to water within the range of 4:1–5:1. As noted previously, the measured slump loss at ½ hour after the addition of water to form the cementitious paste should be no more than 2 inches.

As noted previously, the composition of the present invention can be formulated to provide very low slump loss rates during normal working times. In the preferred embodiment, the slump loss at one-half hour is not more than two inches at 72° F. when the mixture is mixed with water in an amount within the range of 21-23 weight percent of the dry mixture. Usually a one half hour slump loss of about one inch or less at 72° F. is provided. By way of example, a product formulated in accordance with the present invention, upon addition of water in an amount of about 22 percent of the dry mixture with five percent air entrainment, had a measured slump at three minutes after mixing with water of about five inches. At thirty minutes after mixing, the measured slump was four inches; i.e., a slump loss of only one inch. As will be understood by those skilled in the art, slump testing is carried out in accordance with ASTM Standard C 143-90. For a further description of the testing of freshly made concrete, including slump tests, reference is made to Kosmatka et al., Chapter 14, entitled "Control Tests for Quality Concrete", at pages 163–176.

Although the cement component can be formulated from two cement constituents, it usually will be preferred to provide a formulation containing three constituents. The first, as described previously, is preferably Type S masonry cement. Type N cement can be substituted for the Type S masonry cement where lower strength demands are involved. And, in some cases, the higher strength Type M cement can be employed in lieu of the Type S cement. The Type S masonry cement provides fine cement particles, an air entraining agent, and finely ground limestone particles and dust, which usually will work to advantage in the formulation of the present invention. The Type S cement provides cement and limestone fines that function to block the pores in the light weight aggregate which tend to absorb water thus decreasing water absorption into the aggregate. In a similar vein, the cement also provides calcium silicate gel which tends to plug the pores and crevices in the fight weight aggregate. The air entraining agent causes the formation of small air bubbles that tend to block or fill the void spaces and crevices in the light weight aggregates. These three activities function together to retard the absorption of water by the light weight aggregate. In addition, when the cement formulation containing the Type S cement is hydrated, calcium hydroxide is formed.

Calcium hydroxide formation is significant since it can be involved in several reactions leading to good long term strength. It also enables fly ash which may be present in the composition from several sources to react quickly. The air entraining agent, or more properly the small air bubbles formed in the formulation, also acts to improve workability of the cement slurry and aids in finishing. It also contributes to a good freeze-thaw resistance.

In the preferred formulation of the present invention the second cement constituent is Type IP cement and the third is Type III cement. As in the other formulations described herein employing a high early strength cement, the third constituent, Type III in the formulation under consideration here, is used in an amount approximately twice that of each of the first cement constituent, Type S, and the second cement constituent, Type IP. Stated otherwise, the preferred ratio of the third constituent to each of the first and second constituents is about 2:1.

As described below, these concentrations can vary somewhat, but as a practical matter, each of the first and second constituents, Type S and Type IP are present in amounts within the range of 10–30 wt. % of the cement formulation and more preferably, within the range of 20–30 wt. %. The third, high early strength, cement constituent is present in an amount within the range of 40–60 wt. %. The Type III cement acts in conjunction with the Type S cement to provide good strength characteristics as the cement sets. The Type III, as noted earlier, provides good early strength. This helps to boost the somewhat lower but still adequate strength contribution of the Type S masonry cement. When the strength characteristics of these two cement constituents are compared, the contribution made by Type S is low and continuous, whereas the strength contribution of the Type III cement is fast and high. The Type IP cement, which is the preferred form of the second cement constituent, is in between the Type S and Type III cements. The strength gains associated with the Type S cement range from about 2 or 3 days to about 28 to 35 days. The Type IP cement ranges in strength gains from about 3 days to about 90 days, whereas the Type III cement achieves good strength in one day and reaches its maximum strength in about 7 to 14 days.

As noted previously, calcium hydroxide is produced with the addition of water from the Type S cement and this holds true for the Type III cement as well. The fly ash content present in the pozzolan-containing cement reacts with the calcium hydroxide to form calcium silicate, i.e., $C_3S$ and $C_2S$ in cement chemistry notation. The Type III cement, because it is a faster acting cement than the other constituents, produces calcium hydroxide faster than the Type S cement or the Type K cement. As a result, the fly ash in the Type IP cement is subject to a faster reaction than if it were reacting solely with the portland cement (Type II clinker) in the IP constituent. The fly ash particles and the subsequently produced gel also help control slump loss and contribute to strength gain.

The total cement content of the cementitious product of the present invention is somewhat higher than the cement content found in conventional bagged concrete mixtures of "SAKRETE" and the like which are normally bagged in 80 pound units. As noted previously, the cement content may, in special cases, range as high as ⅔ of the dry concrete mix, although usually there will be less cement than aggregate in the concrete mix.

The Type S and Type IP cement constituents also act to balance one another in air entrainment by the finial mixture. The Type S cement provides for air entrainment, whereas the fly ash content in the Type IP tends to de-train air from the mixture. The fly ash carbon content tends to absorb the air entraining agent. Within the aforementioned ranges of 10–30 percent for each of the Type IP and Type S cements, the two should be balanced to get the proper amount of entrained air, normally 4 to 8 volume percent air when the dry mixture is mixed with about 21 to 23 wt. % water. While air entrainment is highly desirable in terms of workability and durability (freeze-thaw characteristics and impermeability) of the hardened concrete, the amount of entrained air should also be limited since it functions to decrease compressive strength at the higher ranges of about 3,500 psi and above.

Light weight aggregate of the type employed in the present invention has a high water absorption rate. As a result, light weight concrete mixes containing such aggregate have suffered from high slump loss rates becoming, for practical purposes, unworkable within unacceptably short time after mixing with water. Formulations embodying the present invention can be tailored in the relative amounts of constituents to arrive at the desired properties of the final product including a low slump loss as described herein. Once the relative amounts of Type S and Type IP cement to be used in the composition are determined, a balance can be achieved with an adequate amount of Type III, which functions as a major strength contributor to the formulation. Empirical determinations can be made in which appropriate tests are carried out with incrementally increasing amounts of Type III cement for a given Type S and Type IP mixture to arrive at a formulation which is suitable in terms of slump loss, workability, finishability, durability, strength and unit weight. The desired formulation will, as indicated by the aforementioned slump loss rate of two inches or less, hold its slump for suitable periods of time so that it can be worked in much the same manner as the normal heavier ready-to-use concrete mixes. If the relative amount of Type III cement is too small, the formulation could produce a concrete of inadequate compressive strength. The cement content should be such as to provide good workability and finishability.

As noted previously, Type K cement can be used as a substitute for the Type IP cement while retaining the Type S, or other masonry cement constituent, and the Type III cement in approximately the same relative amounts. In this, however, some modifications in the relative amounts of the cement constituents will usually be necessary to provide for the desired characteristic of a slump loss of no more than 2 inches at one half hour after water is added to the mixture. The Type K constituent can be used where an added shrinkage compensating characteristic is desired. The Type K cement constituent can also be used in lieu of both the Type IP and Type III cement constituents, that is to provide a two constituent cement mix. This would result in substantially greater water demand beyond the usual 21-23 wt. % of the dry mixture. Here, the Type K cement will be used in an amount substantially greater than the Type S, or other masonry cement. The ratio of Type K cement to Type S cement will normally be within the range of about 2:1-4:1, and usually will be about 3:1. Water demand will depend upon the Type K to Type S ratio, but may range as high as 27%. Where the Type K cement is used as a substitute for the Type III cement while retaining the pozzolanic and masonry cement constituents, the Type K cement will normally be used in an amount greater than either the Type IP or Type S cements. Here, the nominal relative proportions of the three cement constituents will be about ¼ Type IP, ¼ Type S, and about ½ Type K cement. The Type K cement is finely ground and its particles have significantly greater gel potential. This also helps control slump loss due to the light weight aggregate.

In addition, in special applications, Type I or Type II cement. The aggregate was a finely crushed and grated aggregate in the form of a blended aggregate formed from a mixture of two parts of a fine aggregate having a sieve analysis as set forth in Table I and one part of a medium aggregate having a sieve analysis as set forth in Table II.

TABLE I

| Fine Aggregate | |
|---|---|
| Sieve Size | Percent Passing |
| #4 | 100.0 |
| #16 | 65.1 |
| #50 | 23.2 |
| #100 | 15.0 |

TABLE II

| Medium Aggregate | |
|---|---|
| Sieve Size | Percent Passing |
| ½" | 100.0 |
| ⅜" | 87.0 |
| #4 | 10.3 |
| #8 | 7.6 |
| #16 | 0.3 |

The light weight concrete mix and water were mixed in the amount of 41.3 pounds of dry mix and 9.3 pounds of water. The mixture had an air retention factor of 6.2%, a slump shortly after addition of water of 6 inches and a density of 95.9 ppcf. Later slump measurements were not taken in this experimental work, but based upon slump loss work done on other formulations, the estimated slump loss would have been less than two inches and probably in the order of one inch or less. In this regard, slump loss work on similar formulations showed initial slumps of 7½-8 inches, with slumps 45 minutes after the initial measurements of about 6-6¾ inches. The concrete mix and water mixture yielded a plastic mix of 0.6 cubic feet. The hydrated concrete mixture was allowed to set in specimens in 3"×6" cylinders (surface area 7.07 in.²) and duplicate specimens were tested for compressive strengths at 3, 7, 28 and 56 days. The results are set forth in Table III below:

TABLE III

| | 3 day | | 7 day | | 28 day | | 56 day | |
|---|---|---|---|---|---|---|---|---|
| Type Break | Reg. | Reg. | Reg. | Reg. | Reg. | Reg. | Reg. | Reg. |
| Total Load | 21,900 | 22,350 | 27,500 | 25,600 | 37,700 | 30,000 | 37,000 | 38,300 |
| Unit Load psi | 3,100 | 3,160 | 3,890 | 3,620 | 5,330 | 4,240 | 5,230 | 5,420 |
| Average psi | | 3,130 | | 3,760 | | 4,790 | | 5,330 | portland cement can be used in lieu of the high early strength Type III cement. In this case, the content of the total cement component will be somewhat higher than when Type III is used. Thus, a somewhat lighter aggregate should be used in order to maintain the desired light weight characteristic of the formulation. Finally, although Type S is the preferred masonry cement, Type N and in some cases Type M, masonry cements can be used instead. Type N cement can be used where a somewhat lower compressive strength of the concrete product can be tolerated. Type M can be used where unusually high strengths are desired.

In experimental work carried out respecting the present invention, a light weight concrete was formed of a mixture of a three constituent cement mix and a split fraction light weight aggregate, both meeting ASTM Standard C-330-89. The cement component was formed of one part Type IP cement, one part Type S masonry cement and two parts Type III high early strength In further experimental work, a light weight cement mix formulation similar to that described above, i.e., one part Type IP, one part Type S and two parts Type III was mixed with 23% water to provide a total air content of 5% at a 5 inch slump immediately after mixing with water and having a plastic density of 98 ppcf. Here, two test specimens showed compressive strengths of 3,130 psi and 3,260 after aging for four days and 3,670 psi and 3,850 psi after aging at seven days.

Having described specific embodiments of the present invention, it will be understood that modifications thereof may be suggested to those skilled in the art, and it is intended to cover all such modifications as fall within the scope of the appended claims.

I claim:

1. A light weight cementitious composition comprising a dry mixture of:

a) a hydraulic cement component in said dry mixture comprising a first masonry cement constituent selected from the class consisting of Type S cement, Type M cement and Type N cement, a second cement constituent selected from the class consisting of Type K cement and a pozzolan containing cement, and a third cement constituent having high early strength characteristics relative to said first and second constituents, each of said first and second constituent being present in an amount less than the amount of said third constituent; and b) an aggregate component in said dry mixture comprising a lightweight aggregate present in an amount to provide a bulk density of said dry mixture of no more than about 100 pounds per cubic foot.

2. The composition of claim 1 packaged in a container to provide a product weighing no more than fifty pounds per container.

3. The composition of claim 1, wherein said formulation, after being mixed with water in an amount within the range of 21-23 wt. % of said dry mixture has a slump loss at one half hour of not more than 2".

4. The composition of claim 1, wherein each of said first and second cement constituents are present in an amount within the range of 10-30 wt. % of said dry cement component and said third cement constituent is present in an amount within the range of 40-60 wt. % of said dry cement component.

5. The composition of claim 4, wherein said first cement constituent is selected from the group consisting of Type S masonry cement and Type N masonry cement, said second cement constituent is a Type IP cement, and said third cement constituent is Type III cement.

6. The composition of claim 5, wherein the weight ratio of said third cement constituent to each of said first and second constituents is about 2:1.

7. The composition of claim 6, wherein said aggregate component has an average particle size of less than ⅛ inch.

8. The composition of claim 1, wherein said cementitious composition produces a product having a 28-day concrete strength after mixture with 21-23 wt. % water based upon said dry mixture of at least 2500 psi.

9. The composition of claim 8, wherein said cementitious composition produces a product having a 28-day density of no more than 115 pounds per cubic foot with 21-23 wt. % water based upon said dry mixture.

10. The composition of claim 1, wherein said formulation has an air entraining factor of 4-8 volume percent when mixed with water in the amount within the range of 21-23 wt. % of said dry mixture.

11. A light weight cementitious composition comprising a dry mixture of:

a) a hydraulic cement component in said dry mixture comprising a first masonry cement constituent meeting ASTM standard C91-89, a second cement constituent selected from the group consisting of pozzolanic cement and expansive cement meeting ASTM standard C-845-90, and a third portland cement constituent meeting ASTM standard C-150-89 selected from the group consisting of Type I cement, Type II cement and Type III, each of said first cement constituent and said second cement constituent being present in an amount less than the amount of said third cement constituent; and b) an aggregate component in said dry mixture comprising a lightweight aggregate present in an amount to provide a bulk density of said dry mixture of no more than about 100 pounds per cubic foot.

12. The composition of claim 11, wherein said formulation, after being hydrated with water in an amount within the range of 21-23 wt. % of said dry mixture has a slump loss at one half hour of not more than 2".

13. The composition of claim 12 packaged in a container to provide a product weighing no more than fifty pounds per container.

14. The composition of claim 13, wherein said first cement constituent is a Type S cement, said second cement constituent is a pozzolanic cement, and said third cement constituent is a Type II cement.

15. The composition of claim 11, wherein said aggregate component meets standards as specified in ASTM-C-330 or ASTM-C-331.

16. The composition of claim 12, wherein said cementitious composition produces a product having a 28-day concrete strength after mixture with 21-23 wt. % water based upon said dry mixture of at least 2,500 psi.

17. The composition of claim 16, wherein said cementitious composition produces a product having a 28-day density of no more than 115 pounds per cubic foot after mixture with 21-23 wt. % water based upon said dry mixture.

18. The composition of claim 16, wherein said formulation has an air entraining factor of 4-8 volume percent when mixed with water in the amount within the range of 21-23 wt. % of said dry mixture.

19. A lightweight cementitious composition comprising a dry mixture of:

a) a hydraulic cement component in said dry mixture comprising a first masonry cement constituent selected from the class consisting Type S cement, Type N cement, and Type M cement, a second cement constituent having a high pozzolan content relative to said first constituent and a third cement constituent having high early strength characteristics relative to said first and second constituents, each of said first and second constituents being present in an amount less than the amount of said third constituent; and b) an aggregate component in said dry mixture comprising a lightweight aggregate present in an amount to provide a bulk density of said dry mixture of no more than about 100 pounds per cubic foot.

20. The composition of claim 19, wherein said formulation, after being hydrated with water in an amount within the range of 21-23 wt. % of said dry mixture has a slump loss at one half hour of not more than 2".

21. The composition of claim 20 packaged in a container to provide a product weighing no more than fifty pounds per container.

22. The composition of claim 19, wherein said formulation has an air entraining factor of 4-8 volume percent when mixed with water in the amount within the range of 21-23 wt. % of said dry mixture.

23. The composition of claim 22, wherein said aggregate component meets standards as specified in ASTM-C-330 or ASTM-C-331.

24. The composition of claim 23, wherein said cementitious composition produces a product having a 28-day concrete strength after mixture with 21-23 wt. % water based upon said dry mixture of at least 2500 psi.

25. The composition of claim 24, wherein said cementitious composition produces a product having a 28-day density of no more than 115 pounds per cubic foot with 21-23 wt. % water based upon said dry mixture.

26. A light weight cementitious composition comprising a dry mixture of:
   a) a hydraulic cement component in said dry mixture comprising a first masonry cement constituent selected from the class consisting of Type S cement, Type M cement and Type N cement, a second cement constituent having a high pozzolan content relative to said first cement constituent and a third cement constituent selected from the class consisting of Type I cement, Type II cement, and Type III cement and present in an amount greater than the amount of each of said first and second constituents; and
   b) an aggregate component in said dry mixture comprising a light weight aggregate present in an amount to provide a bulk density of said dry mixture of no more than 100 pounds per cubic foot.

27. The composition of claim 26, wherein said third cement constituent is selected from the class consisting of Type I cement and Type II cement.

28. The composition of claim 27, wherein said first cement constituent is Type S cement.

29. The composition of claim 26, wherein said formulation, after being hydrated with water in an amount within the range of 21-23 wt. % of said dry mixture has a slump loss at one half hour of not more than 2".

30. The composition of claim 29 packaged in a container to provide a product weighing no more than fifty pounds per container.

31. The composition of claim 30, wherein said aggregate component meets standards as specified in ASTM-C-330 or ASTM-C-331.

32. The composition of claim 31, wherein said cementitious composition produces a product having a 28-day concrete strength after mixture with 21-23 wt. % water based upon said dry mixture of at least 2,500 psi.

33. The composition of claim 32, wherein said formulation has an air entraining factor of 4-8 volume percent when mixed with water in the amount within the range of 22-24 wt. % of said dry mixture.

34. A lightweight cementitious composition comprising a dry mixture of:
   a) a hydraulic cement component in said dry mixture comprising a first masonry cement constituent selected from the class consisting of Type S cement, Type M cement and Type N cement, a second cement constituent having a high pozzolan content relative to said first constituent, and a third cement constituent having an expansive ettringite forming sulfoalumina content, each of said first and second constituents being present in an amount less than the amount of said third constituent; and
   b) an aggregate component in said dry mixture comprising a lightweight aggregate present in an amount to provide a bulk density of said dry mixture of no more than about 100 pounds per cubic foot.

35. The composition of claim 34, wherein said formulation, after being hydrated with water in an amount within the range of 21-23 wt. % of said dry mixture has a slump loss at one half hour of not more than 2".

36. The composition of claim 35 packaged in a container to provide a product weighing no more than fifty pounds per container.

37. The composition of claim 35, wherein said formulation has an air entraining factor of 4-8 volume percent when mixed with water in the amount within the range of 21-23 wt. % of said dry mixture.

38. A lightweight cementitious composition comprising a dry mixture of:
   a) a hydraulic cement component comprising a mixture of Type S masonry cement and Type K expansive cement in a weight ratio of Type K cement to Type S cement within the range of 2:1-4:1 and;
   b) an aggregate component in said dry mixture comprising a lightweight aggregate present in an amount greater than the amount of said cement component to provide a bulk density of said dry mixture of no more than about 100 pounds per cubic foot.

39. The composition of claim 38, wherein said formulation, after being hydrated with water in an amount within the range of 21-23 wt. % of said dry mixture has a slump loss at one half hour of not more than 2".

40. The composition of claim 39 packaged in a container to provide a product weighing no more than fifty pounds per container.

41. The composition of claim 40, wherein said formulation has an air entraining factor of 4-8 volume percent when mixed with water in the amount within the range of 21-23 wt. % of said dry mixture.

42. The composition of claim 41, wherein said aggregate component meets standards as specified in ASTM-C-330 or ASTM-C-331.

43. A lightweight cementitious composition comprising a mixture of:
   a) a hydraulic cement component comprising a first masonry cement constituent selected from the class consisting of Type S cement, Type M cement and Type N cement, a second cement constituent selected from the class consisting of Type K cement and Type IP cement, and a third cement constituent having high early strength characteristics relative to said first and second constituents, each of said first and second constituent being present in an amount less than the amount of said third constituent;
   b) an aggregate component in said cementitious composition comprising a lightweight aggregate present in an amount at least as great as the amount of said cement component; and
   c) water present in said cementitious composition in an amount to provide a weight ratio of cement and aggregate to water within the range of 4:1-5:1 and provide a density of said cementitious composition within the range of 95-105 pounds per cubic foot and a slump loss at ½ hour after addition of said water component of no more than 2 inches.

44. The composition of claim 43, wherein each of said first and second cement constituents are present in an amount within the range of 10-30 wt. % of said hydraulic cement component and said third cement constituent is present in an amount within the range of 40-60 wt. % of said hydraulic cement component.

45. The composition of claim 44, wherein said first cement constituent is selected from the group consisting of Type S cement and Type N cement, said second cement constituent is a Type IP cement, and said third cement constituent is a Type III cement.

46. The composition of claim 44, wherein said aggregate component meets standards as specified in ASTM-C-330 or ASTM-C-331.

47. A light weight cementitious composition comprising a dry mixture of:
   a) a hydraulic cement component in said dry mixture comprising a first cement constituent comprising an air entraining agent which provides entrained air in an amount within the range of 4-8 volume percent when said composition is mixed with water in the amount within the range of 21-23 wt. % of said dry mixture, a second cement constituent selected from the group consisting of pozzolanic material meeting ASTM standard C-618-89a and expansive cement meeting ASTM standard C-845-90, and a third portland cement constituent meeting ASTM standard C-150-89 selected from the group consisting of Type I cement, Type II cement and Type III, each of said first and said second cement constituents being present in an amount less than the amount of said third cement constituent; and
   b) an aggregate component in said dry mixture comprising a lightweight aggregate present in an amount to provide a bulk density of said dry mixture of no more than about 100 pounds per cubic foot.

48. The composition of claim 47 having a bulk density of no more than about 85 pounds per cubic foot.

49. The composition of claim 47, wherein said formulation, after being hydrated with water in an amount within the range of 21-23 wt. % of said dry mixture has a slump loss at one half hour of not more than 2".

50. The composition of claim 47 packaged in a container to provide a product weighing no more than fifty pounds per container.

51. The composition of claim 47, wherein said cementitious composition after mixture with 21-23 wt. % water based upon said dry mixture produces a product having a 28-day concrete strength of at least 2,500 psi, and a 28-day density of no more than 115 pounds per cubic foot.

52. The composition of claim 51, wherein said after mixed with water in the amount within the range of 21-23 wt. % of said dry mixture produces a product having a 28 day density of about 100 pounds per cubic foot or less.

53. The composition of claim 47, wherein said second cement constituent comprises a pozzolanic cement meeting ASTM standard C-595-89.

54. A lightweight cementitious paste composition comprising a mixture of:
   a) a hydraulic cement component comprising an air entraining agent, a pozzolanic material meeting ASTM standard C-618-89a, and a portland cement constituent meeting ASTM standard C-150-89 selected from the group consisting of Type I cement, Type II cement and Type III, present in an amount greater than either of said air entraining agent or said pozzolanic material;
   b) an aggregate component in said cementitious composition comprising a lightweight aggregate present in an amount at least as great as the amount of said cement component and providing a bulk density of said hydraulic cement and said aggregate components prior to the addition of the hereinafter recited water of no more than about 100 pounds per cubic foot;
   c) water present in said cementitious composition in an amount to provide a weight ratio of cement and aggregate to water within the range of 4:1-5:1, and;
   d) said paste composition containing entrained air in an amount within the range of 4-8 volume percent and a slump loss at ½ hour after addition of said water component of no more than 2 inches.

55. The composition of claim 54 having a bulk density of no more than about 85 pounds per cubic foot prior to the addition of said water.

* * * * *